(12) United States Patent
Usoro et al.

(10) Patent No.: US 8,262,133 B2
(45) Date of Patent: Sep. 11, 2012

(54) BELT RETRACTOR UTILIZING ACTIVE MATERIAL ACTUATION

(75) Inventors: Patrick B. Usoro, Troy, MI (US); Alan L. Browne, Grosse Pointe, MI (US); Steven G. Corrion, Oxford, MI (US); Xiujie Gao, Troy, MI (US); Nancy L. Johnson, Northville, MI (US); Nilesh D. Mankame, Ann Arbor, MI (US); Lawrence C. Maugh, Ann Arbor, MI (US); William B. Carter, Santa Monica, CA (US); Guillermo A. Herrera, Winnetka, CA (US); Geoffrey P. McKnight, Los Angeles, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 394 days.

(21) Appl. No.: 12/427,868

(22) Filed: Apr. 22, 2009

(65) Prior Publication Data

US 2009/0267339 A1    Oct. 29, 2009

Related U.S. Application Data

(60) Provisional application No. 61/047,314, filed on Apr. 23, 2008.

(51) Int. Cl.
*B60R 22/46* (2006.01)

(52) U.S. Cl. ........ 280/806; 242/381; 242/382; 297/476; 297/479

(58) Field of Classification Search .......... 280/805–808; 242/381, 382; 297/470, 474, 476, 477, 479
See application file for complete search history.

(56) References Cited

U.S. PATENT DOCUMENTS

| | | | | |
|---|---|---|---|---|
| 3,881,667 | A * | 5/1975 | Tandetzke | 242/384.3 |
| 5,607,118 | A * | 3/1997 | Dybro et al. | 242/379.1 |
| 5,765,774 | A * | 6/1998 | Maekawa et al. | 242/390.9 |
| 6,481,659 | B1 * | 11/2002 | Ashtiani et al. | 242/379.1 |
| 6,655,743 | B1 * | 12/2003 | Parizat et al. | 297/477 |
| 6,685,124 | B2 * | 2/2004 | Frank | 242/374 |
| 6,843,143 | B2 * | 1/2005 | Steele et al. | 73/862.393 |
| 7,260,461 | B2 * | 8/2007 | Rao et al. | 701/45 |
| 7,686,339 | B2 * | 3/2010 | Rogers | 280/805 |
| 2006/0226941 | A1 * | 10/2006 | Dimig et al. | 335/220 |
| 2009/0045042 | A1 * | 2/2009 | Browne et al. | 204/157.15 |
| 2010/0066151 | A1 * | 3/2010 | Usoro et al. | 297/481 |
| 2010/0162530 | A1 * | 7/2010 | Schramm | 24/166 |

FOREIGN PATENT DOCUMENTS

| | | |
|---|---|---|
| JP | 62-079652 U | 5/1987 |
| KR | 10-2007-0062540 A | 6/2007 |
| WO | 03-076238 A1 | 9/2003 |

\* cited by examiner

*Primary Examiner* — Paul N Dickson
*Assistant Examiner* — Timothy Wilhelm (57) ABSTRACT

A seat belt retractor utilizing active material actuation for selectively modifying the tension in a seat belt.

8 Claims, 6 Drawing Sheets

BELT RETRACTOR UTILIZING ACTIVE MATERIAL ACTUATION

RELATED APPLICATIONS

This patent application claims priority to, and benefit from U.S. Provisional Patent Application Ser. No. 61/047,314, entitled "SEAT BELT LOAD LIMITING RETRACTOR," filed on Apr. 23, 2008, the disclosure of which is incorporated by reference herein.

BACKGROUND OF THE INVENTION

1. Field of the Invention

The present disclosure generally relates to seat belt retraction devices, and more particularly, to a seat belt retractor having a tensioning mechanism that utilizes active material actuation to modify the tension in the belt.

2. Discussion of Prior Art

Seat belts and seat belt retraction mechanisms are known in the art, particularly with respect to automotive application. These mechanisms typically rely upon mechanical, electromechanical, or pneumatic means for storing energy and tensioning the belt once applied as a restraint. Concernedly, however, these mechanisms typically provide a constant magnitude of tension within the belt, regardless of current events or design preference.

Figure 1:
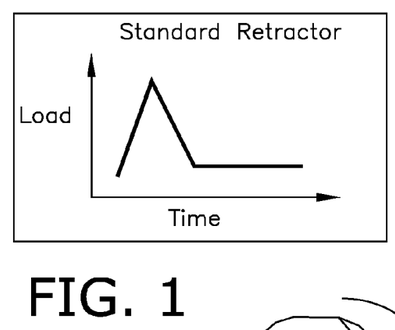
FIG. 1 is a line graph depicting load versus payout for a traditional non-limiting retractor.
Figure 2:
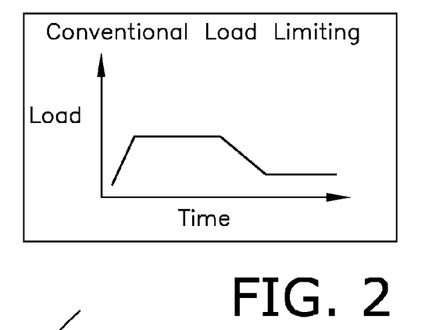
FIG. 2 is a line graph depicting load versus payout for a conventional load limiting retractor.

During a crash event, for example, conventional retractors result in the transmission of peak forces to the occupant. In this regard, FIG. 1 presents an exemplary load versus payout (i.e., rate of dispensing belt webbing) graph of the forces that can be imparted on an occupant wearing a seat belt equipped with a standard retractor. As a result, load limiting retractors have been developed to limit the achievable peak force. Concernedly, however, these retractors also present various concerns in the art. For example, and as shown in FIG. 2, once triggered, conventional load limiting devices produce a constant limited load, and often employ complex electromechanical actuators subject to increased operational, energy consumption, and repair/maintenance costs.

BRIEF SUMMARY

The present invention addresses these concerns by presenting a seat belt retractor that utilizes active material actuation to modify the tension in the restraining belt. The inventive retractor is useful for providing a means for advantageously adjusting the tension in the belt when a predetermined condition or event occurs. For example, the invention is useful for relaxing the tension in the belt during a crash event, so as to modulate the forces that may be imparted upon the occupant during the event. Moreover, the preferred retractor is able to modify the force level or tension within the belt based on occupant anthropometry and the nature of impact (G-level). In addition to limiting the peak force level, the invention is further useful for tailoring the force to achieve digressive load-limiting.

Thus, a first aspect of the invention generically recites a seat belt retractor adapted for use with a seat belt presenting a first tensile load. The retractor comprises a tensioning mechanism coupled to the belt and including an active material element configured to selectively adjust the tension in the belt to a second tensile load, when activated and/or deactivated. Among others, active materials such as shape memory alloys, piezoelectrics, magnetorheological polymers, electroactive polymers, magnetostrictives, electrostrictives, and the like, are suitable for use herein. The use of active material actuators in place of mechanical actuators such as solenoids, servomotors, and the like, minimizes complexity and required packaging space, and reduces weight and noise (both acoustic and with respect to electromagnetic field (EMF) outputs) during operation.

The disclosure may be understood more readily by reference to the following detailed description of the various features of the disclosure and the examples included therein.

BRIEF DESCRIPTION OF THE SEVERAL VIEWS OF THE DRAWING

A preferred embodiment(s) of the invention is described in detail below with reference to the attached drawing figures of exemplary scale, wherein.

DETAILED DESCRIPTION

The present invention concerns a retractor 10 adapted for use with a member 12, such a belt, chain, strap, cable, or the like, under a first tensile load. The invention described and illustrated herein with respect to a vehicular seat belt 12, such as the shoulder retractor shown in FIG. 3; however, it is within the ambit of the invention, to use the retractor 10 in other load limiting devices, such as with respect to aviation seat belts, cargo transportation, cranes, etc.

Figures 3, 3A:
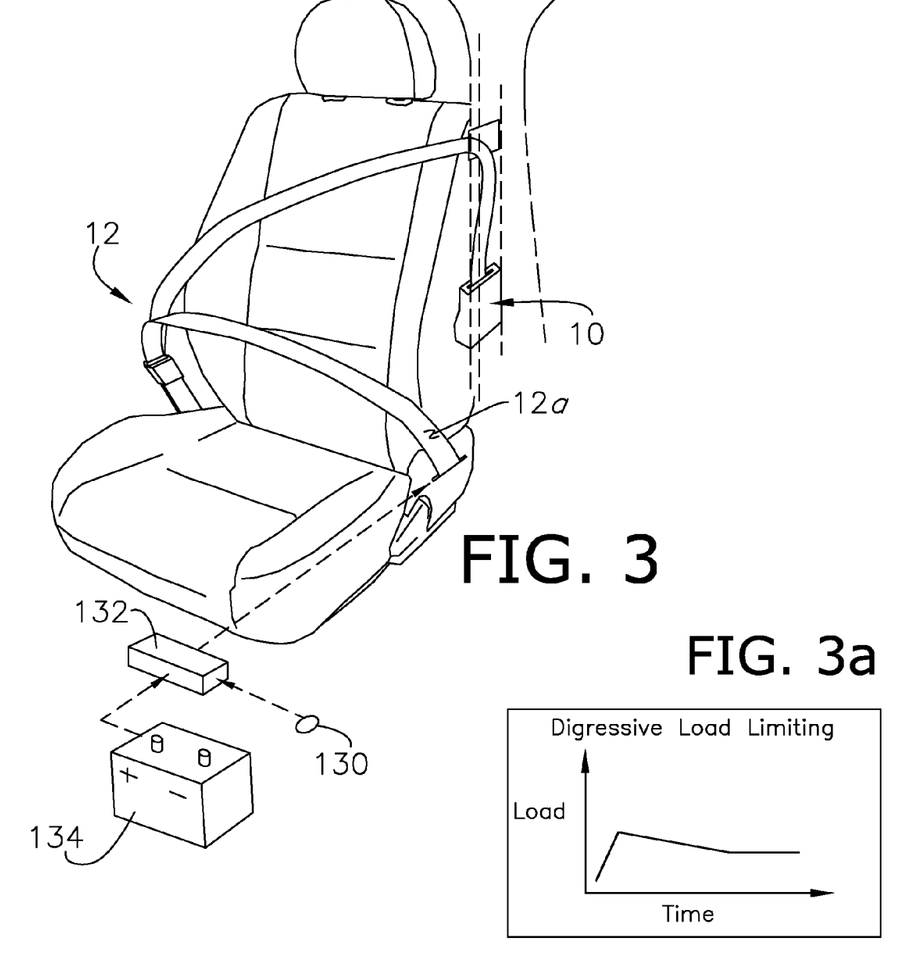
FIG. 3 is a perspective view of an automotive seat including a seat belt presenting a webbing and active load limiting retractor, in accordance with a preferred embodiment of the invention.
FIG. 3a is a line graph depicting load versus payout for a digressive load limiting retractor, in accordance with a preferred embodiment of the invention.

The retractor 10 comprises a tensioning mechanism (i.e., "tensioner") 11 drivenly coupled to the belt 12 and including an active material element 14 configured to adjust the tensile load being experienced by the belt 12. Thus, the invention enables the belt 12 to selectively (e.g., on demand, or autonomously) present a second tensile load while maintaining its function as a restraint. It is appreciated that where the second tensile load is less than the first, the belt 12 may be caused to advantageously "give" under the load of an occupant (not shown) or cargo. More preferably, the inventive retractor 10 is operable to tailor the load in a digressive load-limiting manner (FIG. 3a).

I. Active Material Discussion and Function

The term "active material" as used herein generally refers to a material that exhibits a reversible change in a fundamental property such as dimension, shape, orientation, shear force, or flexural modulus upon application or removal of an activation signal. Suitable active materials, for use in the present invention include, without limitation, shape memory alloys (SMA), ferromagnetic shape memory alloys, electroactive polymers (EAP), piezoelectric materials, magnetorheological elastomers, electrorheological elastomers, and the like.

Depending on the particular active material, the activation signal can take the form of, without limitation, an electric current, an electric field (voltage), a temperature change, a magnetic field, a mechanical loading or stressing, and the like. For example, a magnetic field may be applied for changing the property of the active material fabricated from magnetostrictive materials. A heat signal may be applied for changing the property of thermally activated active materials such as SMA. An electrical signal may be applied for changing the property of the active material fabricated from electroactive materials, piezoelectrics, and/or ionic polymer metal composite materials.

Desirably, the change in the property of the active material remains for the duration of the applied activation signal. In one embodiment, upon discontinuation of the activation signal, the property of the active material generally reverts to an unpowered form and returns substantially to its original property. As used herein, the term "return mechanism" generally refers to any component capable of providing a force opposite to a force provided by the active material, and includes, without limitation, springs, elastomers, additional active materials, and the like.

The invention may include a plurality of active material based actuators at various points about its perimeter. Multiple actuators may provide increased stability, increased torsional stiffness, and the like. Subdivisions and/or combinations of active material can provide additional desirable device benefits, such as improved package size, reduced weight, increased design scalability, larger angular displacements or torques, a digital or step-like actuation, a stacked or staggered actuation to improve controllable resolution, an active reset spring, or differential actuation via antagonistic wire configurations. The active material subdivisions may be configured electrically or mechanically in series or parallel and mechanically connected in telescoping, stacked, or staggered configurations. The electrical configuration may be modified during operation by software timing, circuitry timing, and external or actuation induced electrical contact.

SMA exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf).

Generally, the SMA are softer and more easily deformable in their martensitic phase and are harder, stiffer, and/or more rigid in the austenitic phase. In view of the foregoing properties, expansion of the shape memory alloy is preferably at or below the austenite transition temperature (at or below As). Subsequent heating above the austenite transition temperature causes the expanded shape memory alloy to revert back to its permanent shape. Thus, a suitable activation signal for use with SMA is a thermal activation signal having a magnitude to cause transformations between the martensite and austenite phases.

The temperature at which the SMA remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing shape memory effects, superelastic effects, and high damping capacity.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. Selection of a suitable shape memory alloy composition depends on the temperature range where the component will operate.

Ferromagnetic Shape Memory Alloys (FSMA) are a subclass of SMA. FSMA can behave like conventional SMA materials that have a stress or thermally induced phase transformation between martensite and austenite. Additionally FSMA are ferromagnetic and have strong magnetocrystalline anisotropy, which permit an external magnetic field to influence the orientation/fraction of field aligned martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. One-way shape memory is most useful for latching-type applications where a delayed return stimulus permits a latching function. External magnetic fields are generally produced via soft-magnetic core electromagnets in automotive applications, though a pair of Helmholtz coils may also be used for fast response.

Exemplary ferromagnetic shape memory alloys are nickel-manganese-gallium based alloys, iron-platinum based alloys, iron-palladium based alloys, cobalt-nickel-aluminum based alloys, cobalt-nickel-gallium based alloys. Like SMA these alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends, in part, on the temperature range and the type of response in the intended application.

FSMA are alloys; often composed of Ni—Mn—Ga, that change shape due to strain induced by a magnetic field. FSMA have internal variants with different magnetic and crystallographic orientations. In a magnetic field, the proportions of these variants change, resulting in an overall shape change of the material. An FSMA actuator generally requires that the FSMA material be placed between coils of an electromagnet. Electric current running through the coil induces a magnetic field through the FSMA material, causing a change in shape.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that it has a maximum elastic modulus of about 100 MPa. In another embodiment, the polymer is selected such that it has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric material can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like. Magnetostrictives are commonly termed active materials and yet the relative magnitude of the magnetostrictive effect ranges hugely over the various materials that are lumped in this class, for example "Terfinol" (SP) exhibiting a giant magnetostrictive effect and Galfenol (Sp) exhibiting a "large" magnetostrictive effect.

II. Exemplary Active Retractors and Methods of Use

Various embodiments of the retractor 10 are exemplary shown in FIGS. 3-16 and described below, with the understanding that other equivalent configurations and active materials may be employed without departing from the scope of the present invention.

Figure 4:
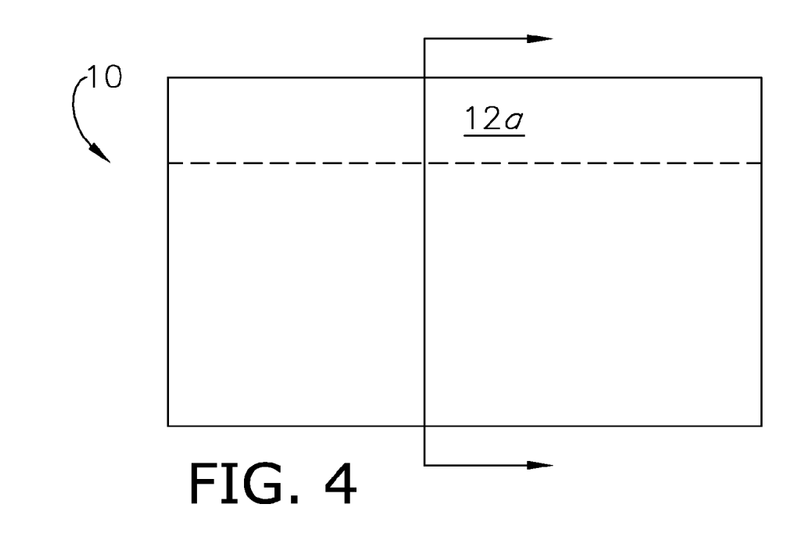
FIG. 4 is an elevation of a seat belt and retractor comprising first and second concentric tubes, in accordance with a preferred embodiment of the invention.
Figure 4A:
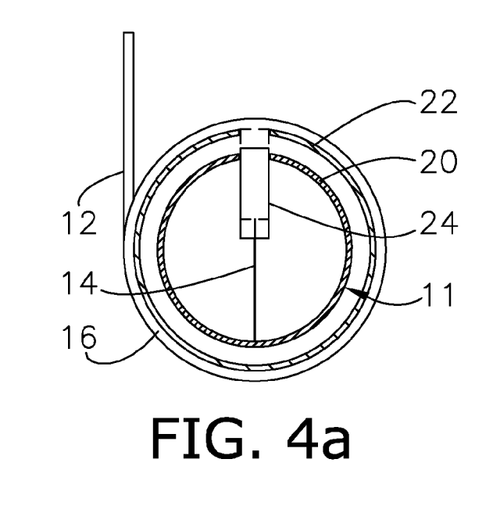
FIG. 4a is a cross-section of the retractor shown in FIG. 4, particularly illustrating an engaging pin and SMA wire actuator.

In FIGS. 4 and 4a, a first end of the belt 12 is anchored to and wrapped around an attachment cylinder 16 which is operatively connected to a re-configurable torsion bar 18. The torsion bar incorporates two concentric and spaced cylindrical tubes 20,22. The concentric tubes 20,22 are selectively coupled using at least one pin 24 such that the effective stiffness of the bar 18 is the combined torsion stiffness of the two concentric tubes 20,22 when inter-coupled, and only the outer tube 22 when disengaged. The pin 24 is driven by at least one, and more preferably a plurality of redundant SMA wires 14, wherein the term "wire" is used in a non-limiting sense and encompasses other similar geometric shapes, such as braids, cables, weaves, bundles, etc. are operatively connected between the pin and the inner tube.

Figure 5:
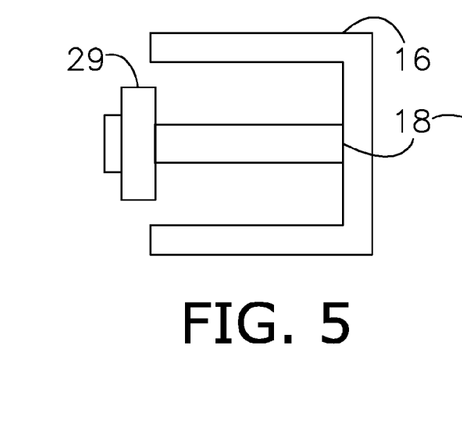
FIG. 5 is an elevation of a seat belt and retractor comprising a shape memory alloy torsion bar, in accordance with a preferred embodiment of the invention.
Figure 5A:
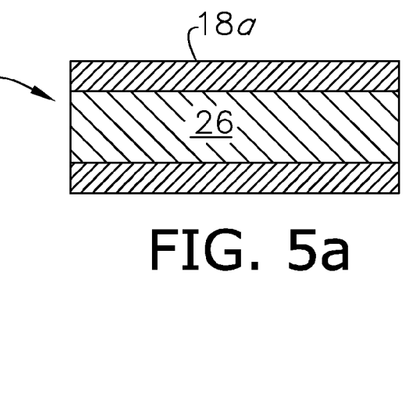
FIG. 5a is a cross-section of a torsion bar presenting a non-active core and a radially exterior SMA segment, in accordance with a preferred embodiment of the invention.
Figure 5B:
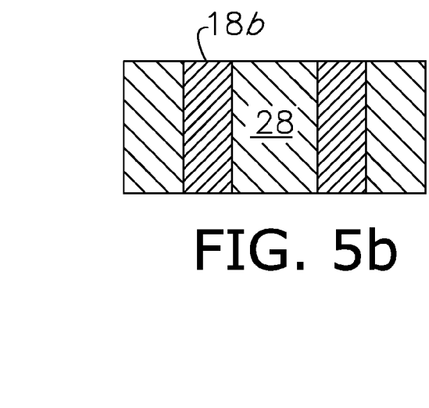
FIG. 5b is a cross-section of a torsion bar presenting alternating SMA and non-active disk segments, in accordance with a preferred embodiment of the invention.

Alternatively, at least a portion 18a of the torsion bar 18 may be composed of a super-elastic SMA, as shown, for example, in FIGS. 5-5b. The bar 18, in this configuration, may present a solid body of SMA or variously a composite structure consisting of separate portions of SMA and at least one other material (e.g., rigid metal, etc.). For example, as shown in FIG. 5a, the bar 18 may consists of a solid core 26 of spring steel, and a longitudinal layer 18a of superelastic SMA exterior to, so as to form superjacent layers with the core 26. Another example, is shown in FIG. 5b, wherein a plurality of spring steel disk segments 28 are spaced by cross-sectionally congruent SMA disk segments 18b. The segments 18b,28 are permanently bonded or otherwise relatively fixed to each other, so as to transfer the anticipated torsional forces through the length of the bar 18 without slippage. Finally, it is appreciated that a ratchet 29 may be provided at the distal end of the bar 18 (or compound cylinder) throughout the exemplary embodiments, so as to enable load limiting in a first direction and present a hold in the other.

During a crash, or other condition/event, the superelastic properties of the SMA are used to achieve reduced tension in the belt 12 as strain increases. That is to say, the strain experienced in the bar 18 function to transition the SMA back to the Martensitic phase and therefore reduce the tensile resistance of the bar 18. Finally, in this configuration it is appreciated that the portions 18a may also consist of shape memory polymer, magneto-rheological (MR) and electro-rheological (ER) fluids (controllable shear strength), and MR elastomer (controllable stiffness change, an example is concentric lobe shaped configuration).

Figure 6:
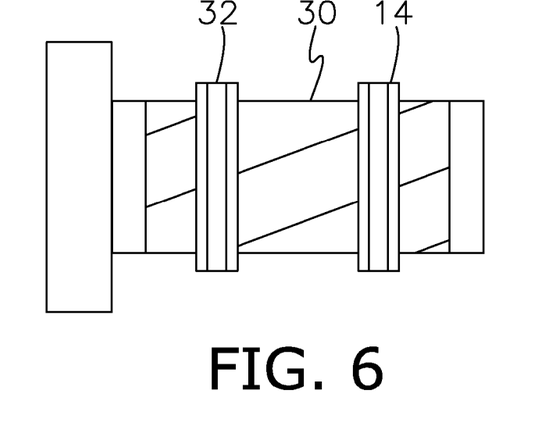
FIG. 6 is an elevation of a retractor comprising an inner tube and plural active material engaged collars, in accordance with a preferred embodiment of the invention.
Figure 6A:
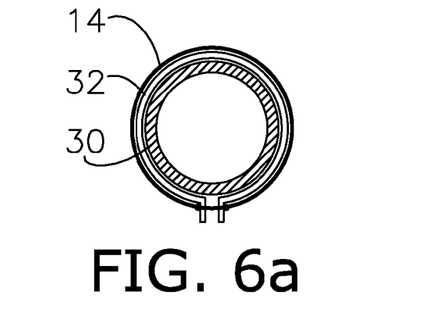
FIG. 6a is a cross-section of the retractor shown in FIG. 6, particularly illustrating a collar and shape memory wire encircling the collar.

In the embodiment shown in FIG. 6, a segmented hollow torsion cylinder 30 replaces the bar 18. A plurality of open collars 32 encircles the hollow torsion cylinder 30. Each collar 32 has at least one shape memory (e.g., SMA) wire 14 wrapped around it and is configured such that the contact force between the collar 32 and cylinder 30 is controllable by controlling the length and tension in the SMA wires 14. As a result, the effective torsion stiffness of the cylinder 30 is controlled and the torque level at which the hollow cylinder 30 will collapse is modulated.

Figure 7:
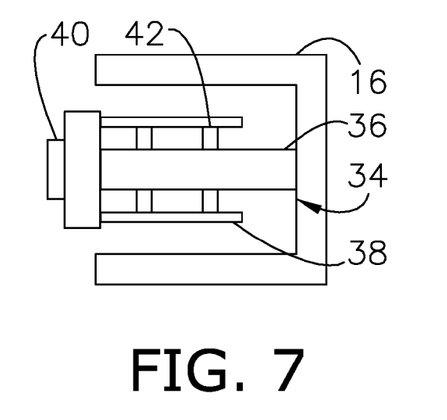
FIG. 7 is an elevation of a torsion bar comprising inner and outer tubes and plural expansion dutches/brakes for selectively engaging the tubes, in accordance with a preferred embodiment of the invention.

In the embodiment shown in FIG. 7, the attachment cylinder 16 is operatively connected to one end of a compound torsion cylinder 34 including inner and outer (e.g., first and second) concentric cylindrical members 36,38. The members 36,38 are connected to a fixed structure 40 at one end and only the inner cylindrical member (e.g., shaft) 36 is connected at the other end to the attachment cylinder 16. Active material actuated expansion clutches/brakes (e.g. DEA based, SMA modulated wave springs, etc.) 42 are disposed between the two concentric cylinder members 36,38 such that the effective length and torsional stiffness of the cylinder 34 can be modulated by controlling the friction force therebetween.

Figure 7A:
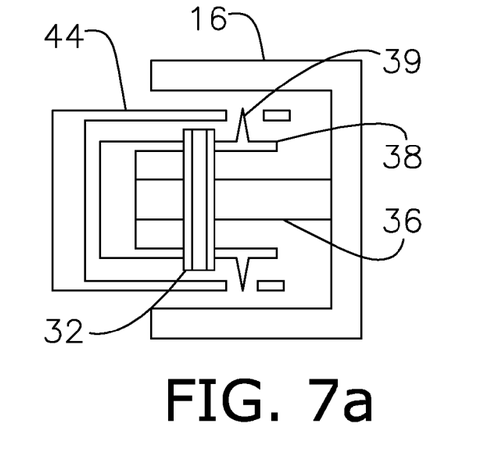
FIG. 7a is an elevation of a torsion bar alternative to FIG. 7, further comprising a third tube, and wherein a collar is used to selectively disengage a gear transmission inter-engaging the outer two tubes, in accordance with a preferred embodiment of the invention.

During a crash event, for example, this capability can be utilized to modulate the tension in the belt 12 to realize a digressive load limiting retractor 10. Multiple SMA wires 14 (or PZT composites, etc.) may be employed with the capability that different numbers of wires 14 may be activated to pull away different numbers of friction/brake pads, or ratchet teeth. As shown in FIG. 7a, additional flexibility can be achieved by adding a third cylindrical member 44 concentric with and exterior to the first two members 36,38. The third member 44 is selectively coupled to the second member 38 through a transmission 39, such as the gear/sprocket coupling (positive drive) shown. In the illustrated embodiment, the third member 44 is selectively released by at least one active material collar 30 encircling the second member 38, and causable to radially contract, so as to squeeze the second cylindrical member 38 inward, by activation as previously described.

Figure 8:
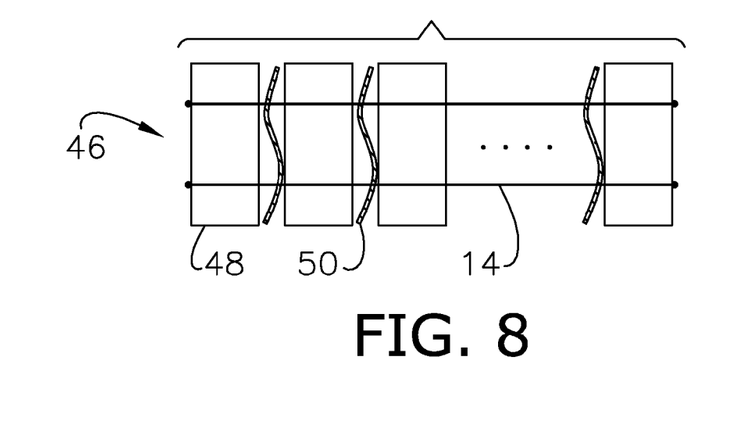
FIG. 8 is an elevation of a torsion bar comprising a plurality of disk segments spaced by a plurality of separator springs, and shape memory wires interconnecting and compressing the segments and springs, in accordance with a preferred embodiment of the invention.

In the embodiment shown in FIG. 8, a torsion cylinder 46 comprises multiple disk segments 48 separated by at least one compressible element (e.g., separator spring) 50. The segments 48 and springs 50 are fixedly secured and compressed by active material elements 14, such as the SMA wires shown. The wires 14 work against the separator springs 50, such that the effective stiffness of the torsion cylinder 46 is therefore controllable by controlling the tension in the wires 14 relative to the combined force of the springs 50. This enables the tension in the belt 12 to be selectively modulated.

Figure 9:
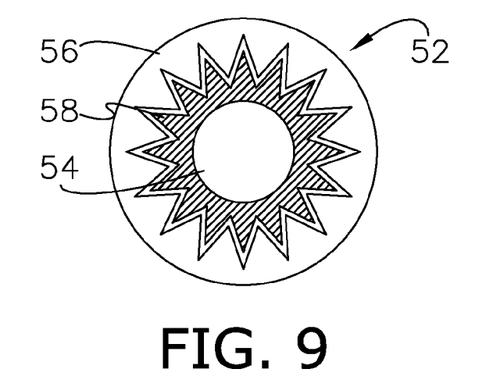
FIG. 9 is a cross-section of a torsion bar comprising an inner shaft defining radial active material teeth and an outer tube defining an internal gear intermeshing the teeth, in accordance with a preferred embodiment of the invention.

In FIG. 9, another example of a compound torsion cylinder 52 including inner and outer concentric cylindrical members 54,56 is presented. Here, one of the members 54,56 is connected to fixed structure 40 at one end and the other is connected to the cylindrical member 16. The two concentric cylindrical members 54,56 are inter-engaged though an internal transmission 58 configured to variably transmit torque from one member to the other. At least a portion of the transmission is formed of super-elastic SMA material such that under high torsion, the transmission will be caused to slip due to stress-induced Austenite to Martensite transformation.

For example, and as more particularly shown in FIG. 9, the transmission 58 may be a gear drive presenting a plurality of normally Austenitic SMA gear teeth fixedly attached to the inner member (e.g., shaft) 54. The outer cylindrical member 56 presents an internal gear intermeshing the teeth. It is appreciated that this effect will limit the peak torque of the torsion cylinder 52 and therefore the tension in the belt 12 during a dynamic event. Alternatively, it is appreciated that shape memory polymer, and normally Martensitic shape memory alloy may also be used if a thermal set is provided.

Moreover, the gear transmission 58 may be formed of MR elastomer, wherein either the shaft 54 or tube 56 is preferably stationary, so that relative rotation therebetween is permitted only through the deformation of the MR elastomer material. The torque held by the cylinder 52 is dependent on the stiffness of the MR elastomer material and more particularly, the resistance to motion imposed thereby. This stiffness or resistance is controllable by causing and/or changing a magnetic field exposed to the MR elastomer, which in turn controls the tension in the belt 12.

Figure 10:
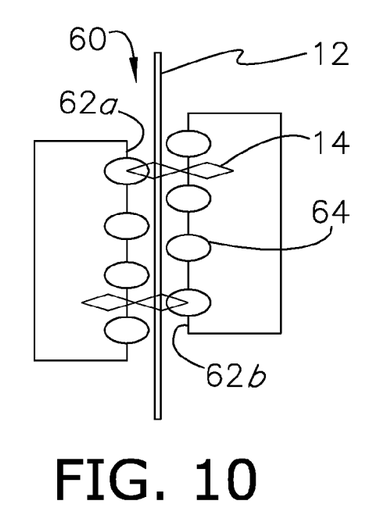
FIG. 10 is an elevation of a belt webbing and retractor comprising first and second parts having emanating from opposite surfaces a plurality of protrusions, and a plurality of shape memory wires interconnect the parts, in accordance with a preferred embodiment of the invention.
Figure 10A:
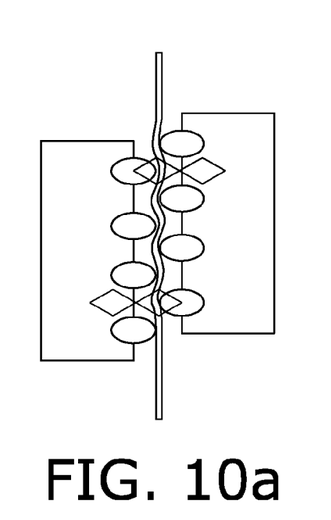
FIG. 10a is an elevation of the webbing and retractor shown in FIG. 10, wherein the wires have been activated so as to cause the protrusions to inwardly translate and engage the webbing.

FIGS. 10-10a depict another example, wherein digressive load limiting is achieved by passing the webbing 12a through an adjustable maze 60 is presented. The maze 60 is formed by first and second opposites surfaces 62a,b cooperatively defining a gap. The surfaces 62a,b have emanating therefrom a plurality of intermittent cylindrical (or other form) protrusions 64, which jut inwardly within the gap. The protrusions 64 may be aligned, so as to clamp the webbing 12a, or misaligned so as to be inter-meshed (FIGS. 10-10a). The webbing 12a of the belt is preferably disposed within the gap equidistance from the surfaces 62a,b.

The surfaces 62a,b and/or protrusions 64 are drivenly coupled by at least one active material element 14 operable to move the protrusions 64 in concert or individually, so as to engage the webbing 12a. Either the protrusions 64 alone or the surfaces 62a,b may be moved. More particularly, when caused to travel inward, the protrusions 64 increasingly bear a holding force upon the webbing 12a (FIG. 10a), thereby removing slack and increasing tension therein. As shown in FIGS. 10-10a, the elements 14 may present SMA wire loops orthogonally interconnecting the surfaces 62a,b.

Figure 11:
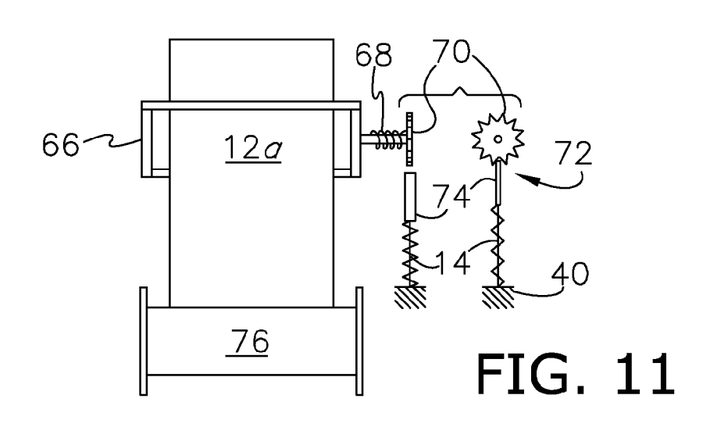
FIG. 11 is an elevation of a seat belt webbing, spool, and retractor comprising a frame pivotally coupled to a sprocket wheel and entraining the webbing, a torsion spring interconnected to the frame and wheel, and a latching mechanism having an active material release, in accordance with a preferred embodiment of the invention.

In FIG. 11, the belt 12 is entrained by a rectangular frame 66 connected to one end of a torsion spring 68 and rotationally coupled to a (e.g., sprocket, friction, etc.) wheel 70. The spring 68 is anchored at its opposite end to the wheel 70. A latching mechanism 72 is positioned and configured to selectively engage the wheel 70, so as to prevent its rotation, and includes an active material release element 14. As shown in FIG. 11, the mechanism 72 may include a pin 74 spring biased towards an extended position, and an SMA wire 14 interconnecting the pin 74 and fixed structure 40.

When activated, the wire 14 overcomes the biasing force and causes the pin 74 to disengage the wheel 70. When the wheel 70 is not latched the torsion spring 68 rotates freely and does not store energy. When the wheel 70 is latched to the fixed structure 40 by the action of the element 14, and the frame 66 is caused to rotate by pulling the belt 12 forward, the torsion spring 68 absorbs energy from the webbing 12a, thereby modifying the tension in the belt 12. Finally, it is appreciated that the relationship between load and webbing payout is tunable by changing the width of the rectangular frame 66.

Alternatively, it is appreciated that the storage of torsional energy may be effected from an axle stemming from the spool 76 (FIG. 11) about which the retracted belt 12 is wound, such that pulling and extending the belt 12 causes the spool 76 to undergo multiple revolutions operable to store greater energy. In another alternative, it is appreciated that an SMA actuated ratcheting mechanism (not shown) may replace the wheel 70 and pin 74. Here, SMA can be used to turn the ratchet to rotate the frame 66 and alter the webbing path to affect payout or to "take up" webbing.

Figure 12:
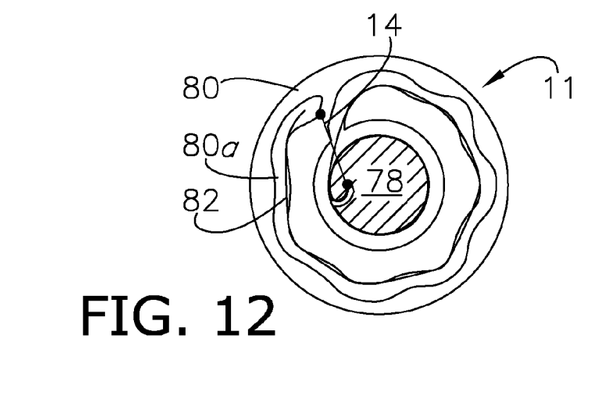
FIG. 12 is a cross-section of a retractor comprising an inner shaft connected to a cable, a deformable outer tube concentric with the shaft and defining a radial groove wherein the cable is received, and an active material element operable to deform the tube and groove, in accordance with a preferred embodiment of the invention.

In FIG. 12, another example is depicted, wherein a torsion bar 78 is located inside a stationary cylinder 80, the cross-section of which defines a circular groove 80a. A cable 82 is attached at one end to the torsion bar 78 and threaded through the groove 80a. The cylinder 80 and cable 82 are cooperatively configured such that friction therebetween resists rotation by the torsion bar 78. As such, the cable 82 preferably presents a helical configuration and/or exterior treatment/sheath (not shown) that promotes friction. The cylinder 80 is deformable, and inter-engaged with an active material element 14 operable to cause the groove 80a to collapse and/or otherwise deform, so as to modulate the frictional resistance between the groove 80a and the cable 82. Thus, during a dynamic event, the torque transmitted by the torsion bar 78 can be modulated by changing the resistance to movement of the cable 82, so as to achieve a digressive load limit.

Alternatively, the cable 82 may be formed of SMA so that the stiffness of the cable 82 and thus the pull through force can be altered by activating the SMA; or conversely, where the SMA is normally Austenitic, it is appreciated that load limiting will occur from stress induced transformation to the Martensitic phase, taking into consideration the super-elasticity and the hysteresis associated therewith.

Figure 13:
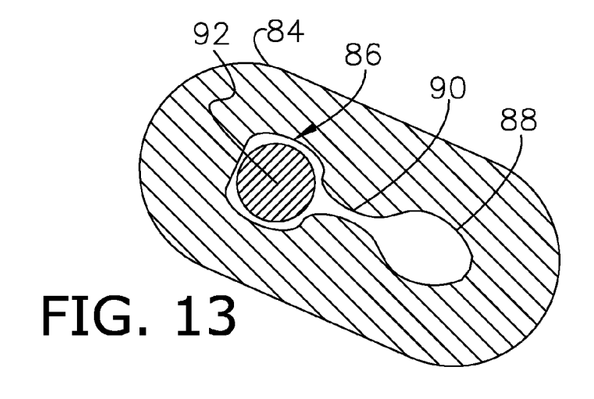
FIG. 13 is an elevation of an active material flange defining an hour-glass slot and a bolt coupled to the webbing, in accordance with a preferred embodiment of the invention.

FIG. 13 shows an arrangement that utilizes a super-elastic SMA flange 84 defining an hour-glass slot 86 having distal normal width portions 88 interconnected by a more narrow width pass 90. The flange 84 is preferably secured to fixed structure 40. The belt 12 is fixedly coupled to a bolt 92 presenting a diameter less than the normal but greater than the narrow width, so as to be received within one of the portions 88. The bolt 92 and belt 12 are cooperatively configured such that the bolt 92 is received by the flange 84 in normal operating conditions. The retractor 10 is otherwise configured such that tension in the webbing 12a causes the bolt 92 to attempt to travel along the longitudinal axis of the slot 86. The narrow pass 90 provides an initial resistance to the movement of the bolt 92, until enough stress is achieved to cause the adjacent material to transition to the Martensitic state. In this state, the applied tension causes the bolt 92 to be forced through the softer pass 90, thereby limiting tension.

It is appreciated that the tension in the webbing 12a is a function of the resistance that the bolt 92 encounters, which in turn is dependent on the geometry of the slot 86 and the super-elastic properties of the SMA flange 84. More preferably, the second or down-stream portion 88 may present a slightly smaller than normal width that provides low to moderate resistance to bolt movement, once the bolt 92 completes the pass 90. Thus, digressive load limiting is autonomously realized in a dynamic situation.

Figure 14:
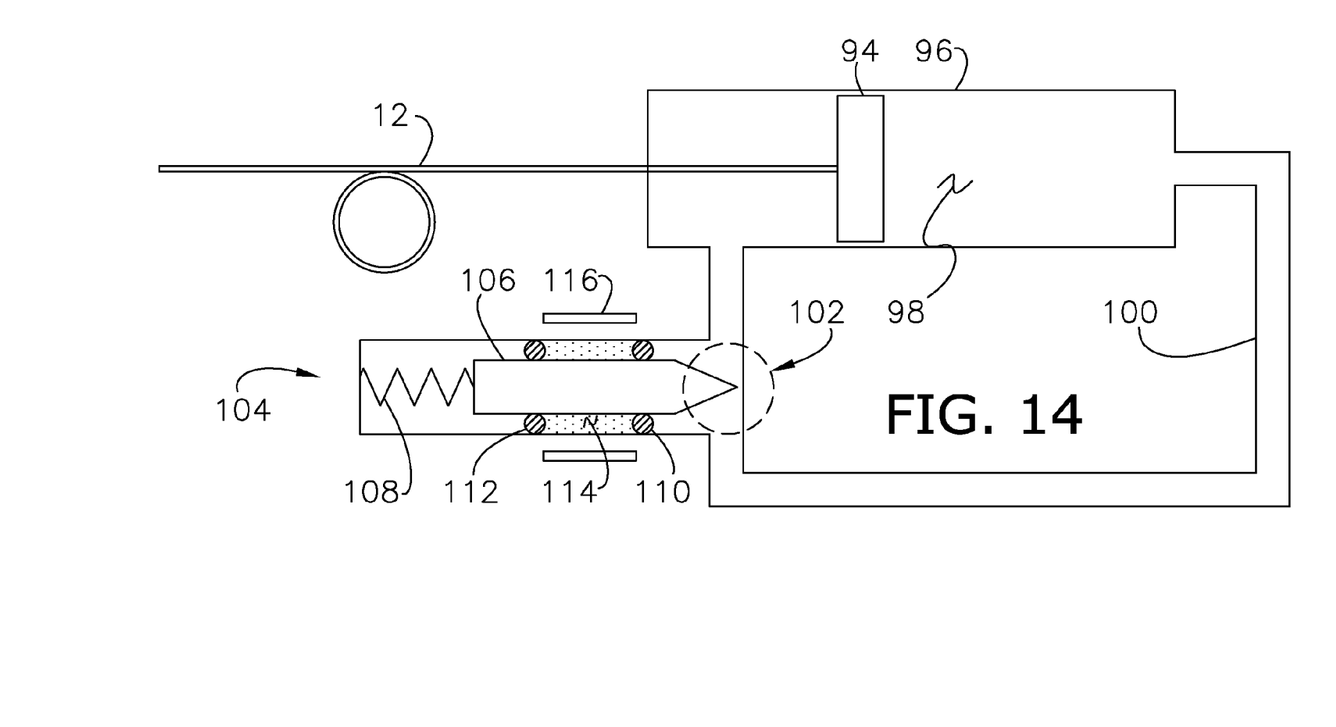
FIG. 14 is an elevation of a belt webbing and retractor comprising a piston housed with a chamber filled with a fluid, an orifice fluidly coupled to the chamber, and a Magnetorheological restrictor encroaching the orifice, in accordance with a preferred embodiment of the invention.

In another embodiment shown in FIG. 14, the belt 12 is operatively connected to a piston 94 disposed in a chamber 96 filled with a fluid (e.g., air, hydraulic fluid, etc.) 98. The fluid 98 recirculates from one side of the piston 94 to the other through a re-circulating conduit 100. The flow rate is controlled through an orifice/valve 102 defined by the conduit 100 using an MR restrictor assembly 104. As shown in FIG. 14, the restrictor assembly 104 further includes a wedge 106 translatable so as to variably encroach the orifice 102 and thereby block fluid flow. The wedge 106 is biased towards an extended position, wherein encroachment and blockage is maximized, by a compression spring 108. Fore and aft O-ring seals 110,112 engage the wedge throughout its translation and cooperate with the conduit 100 to form a confined space. MR fluid 114 is disposed within the space, so as to frictionally engage the wedge 106. Finally, an electromagnetic coil 116 surrounds the space and is operable to generate a magnetic activation signal that causes the fluid 114 to increase in viscosity and shear strength. This results in increased friction along the wedge 106, and greater resistance to wedge translation, fluid flow, and consequentially piston translation.

Thus, the orifice size is controlled by changing the magnetic field imposed on the MR fluid 114. Tension in the belt 12 is a function of the resistance to the motion of the piston 94. Alternatively, it is appreciated that the chamber 96 may also be filled with MR fluid. Here, the resistance to piston motion may likewise be controlled by changing the yield stress of the MR fluid with a magnetic field.

Figure 15:
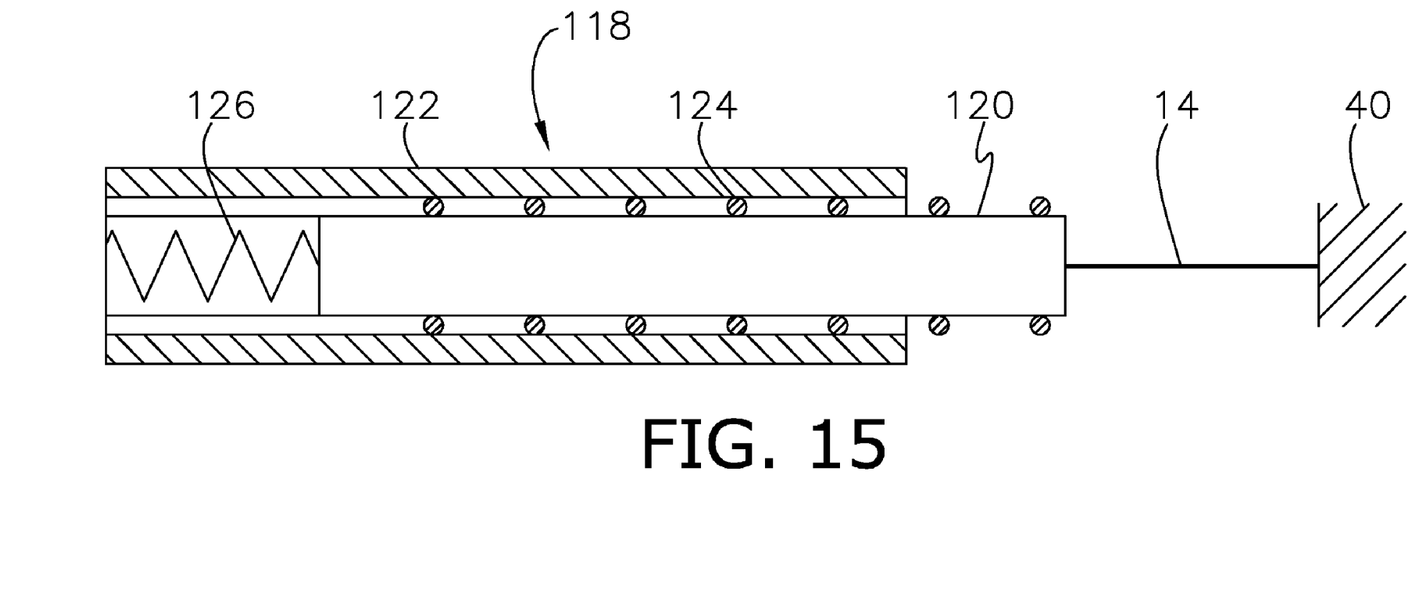
FIG. 15 is a cross-section of a torsion bar comprising an inner shaft, outer tube, a plurality of spheres inter-engaging the shaft and tube, and an active material actuator including a shape memory wire and return spring configured to cause relative translation between the shaft and tube, in accordance with a preferred embodiment of the invention.

In yet another example, the belt 12 may be attached to and wrapped around a torsion bar 118 that is comprised of an inner shaft 120 and an outer tube 122 concentrically aligned with the shaft 120 (FIG. 15). A plurality of spheres 124 formed preferably of SMA in a normally super-elastic or Austenitic state is disposed between the shaft 120 and tube 122. The preferred spheres 124 are affixed to the inner shaft 120 and preferably ride axially within grooves (not shown) defined by the outer tube 122. When the shaft 120 or tube 122 are caused to rotate, torque is transmitted between the inner shaft 120 and outer tube 122 through the spheres 124.

For example, in FIG. 15, the inner shaft 120 is rotationally stationary and is attached to an active material element 14 (e.g., SMA wire). The element 14 is operable to cause the inner shaft 120 to axially translate relative to the outer tube 122. A return spring 126 is attached to the opposite end of the shaft 120 and biases the shaft 120 towards a nominal position, wherein the shaft 120 is fully recessed. As the overlap between the inner shaft 120 and outer tube 122 increases/decreases more or less of the spheres 124 are engaged, such that the effective stiffness of the torsion bar 118 increases/decreases. Thus, the torque in the torsion bar 118, and therefore the tension in the belt 12, are controlled by activating and deactivating the element 14 so as to cause relative displacement between the shaft 120 and tube 122.

Finally, and as further shown in FIG. 3, the preferred embodiment of the invention includes at least one sensor 130 operable to detect a condition or event (e.g., the dynamic or crash event). The sensor 130 is communicatively coupled to the element 14 and configured to cause its activation upon detection. More preferably a controller 132 is intermediately and communicatively coupled to the element 14, sensor 130, and a signal source (e.g., the charging system of a vehicle) 134. The controller 132 is operable to cause the element 14 to be exposed to or occluded from the activation signal only when the condition or event is detected. For example, the controller 132 and sensor 130 may be cooperatively configured to determine occupant anthropometry and/or position, a pre-crash condition, or a crash event. With respect to the latter, the controller 132 and sensor 130 may be further configured to further determine a crash characteristic such as the closing velocity of the vehicle, vehicle crush pulse, and the type of object being impacted, and tailor the response accordingly.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. Furthermore, all ranges directed to the same quantity of a given component or measurement is inclusive of the endpoints and independently combinable.

What is claimed is:

1. A seat belt retractor adapted for use with a seat belt presenting a first tensile load, said retractor comprising:
    a tensioning mechanism coupled to the belt and including an active material element operable to undergo a reversible change in fundamental property when exposed to or occluded from an activation signal,
    said mechanism being configured to selectively adjust the tension in the belt to a second tensile load, as a result of the change, wherein the mechanism includes first and second inter-engaged parts, and the first part is able to transmit a first maximum torque or force to the second part when the element is activated and a second maximum torque or force when deactivated, a plurality of torque-transmitting spheres are fixed to a first of the parts and contact the other, so as to be intermediately disposed therebetween, and the element is operable to cause the parts to relatively translate so as to reduce or increase the plurality of spheres.

2. The retractor as claimed in claim 1, wherein the mechanism is further configured to gradually adjust the tension, so as to present digressive load limiting.

3. The retractor as claimed in claim 1, wherein the mechanism includes a multi-component torsion bar operable to present first and second torsional strengths when the element is activated and deactivated respectively.

4. The retractor as claimed in claim 3, wherein the bar includes inner and outer concentric tubes having respective torsional strengths, and the tubes are caused to inter-engage by the change.

5. The retractor as claimed in claim 1, further comprising:
a controller communicatively coupled to the mechanism; and
at least one sensor communicatively coupled to the controller, and operable to detect a condition or event,
said controller and sensor being cooperatively configured to cause the element to be exposed to or occluded from the signal upon detection of the event.

6. The retractor as claimed in claim 5, wherein said at least one sensor includes a pre-crash, or crash sensor.

7. The retractor as claimed in claim 6, wherein said at least one sensor is operable to determine a crash characteristic selected from the group consisting essentially of closing velocity, vehicle crush pulse, and the type of object being impacted.

8. The retractor as claimed in claim 1, wherein the element is formed of an active material selected from the group consisting essentially of shape memory alloys, electroactive polymers, and piezoelectric materials.

* * * * *